(12) United States Patent
Xu et al.

(10) Patent No.: US 12,027,696 B2
(45) Date of Patent: Jul. 2, 2024

(54) TERNARY POSITIVE ELECTRODE MATERIAL COATED WITH NITRIDE/GRAPHITIZED CARBON NANOSHEETS AND PREPARATION METHOD THEREOF

(71) Applicants: GEM CO., LTD., Shenzhen (CN); GEM (HUBEI) NEW ENERGY MATERIALS CO., LTD., Jingmen (CN)

(72) Inventors: Kaihua Xu, Shenzhen (CN); Rui He, Jingmen (CN); Weifeng Ding, Jingmen (CN); Yunhe Zhang, Shenzhen (CN); Xiang Zhang, Jingmen (CN); Kun Zhang, Shenzhen (CN)

(73) Assignees: GEM CO., LTD., Shenzhen (CN); GEM (HUBEI) NEW ENERGY MATERIALS CO., LTD., Jingmen (CN)

( * ) Notice: Subject to any disclaimer, the term of this patent is extended or adjusted under 35 U.S.C. 154(b) by 0 days.

(21) Appl. No.: 18/495,730

(22) Filed: Oct. 26, 2023

(65) Prior Publication Data

US 2024/0097116 A1 Mar. 21, 2024

Related U.S. Application Data

(63) Continuation of application No. PCT/CN2022/108630, filed on Jul. 28, 2022.

(30) Foreign Application Priority Data

Oct. 29, 2021 (CN) .......................... 202111271987.7

(51) Int. Cl.
*H01M 4/36* (2006.01)
*H01M 4/02* (2006.01)
*H01M 4/505* (2010.01)
*H01M 4/525* (2010.01)
*H01M 4/583* (2010.01)

(52) U.S. Cl.
CPC ........... *H01M 4/366* (2013.01); *H01M 4/505* (2013.01); *H01M 4/525* (2013.01); *H01M 4/583* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| 2006/0154416 A1* | 7/2006 | Seitz | H01M 14/00 438/238 |
| 2024/0083767 A1* | 3/2024 | Lee | H01M 4/02 |

FOREIGN PATENT DOCUMENTS

CN 112038627 A 12/2020

* cited by examiner

*Primary Examiner* — Scott J. Chmielecki

(57) ABSTRACT

The invention discloses a ternary positive electrode material coated with nitride/graphitized carbon nanosheets and preparation method thereof. The ternary positive electrode material coated with nitride/graphitized carbon nanosheets includes a ternary positive electrode material matrix and a coating layer; the coating layer is composed of nitride and graphitized carbon; and the graphitized carbon is formed in situ in the coating process of the nitride. Compared with a physical mixing method, the in-situ generated carbon layer is connected to the material matrix more tightly, and the formed conductive network is denser. So that the rate performance of the material is improved to the maximum extent. The preparation method is simple and easy to realize industrial production. And the obtained ternary positive electrode material coated with nitride/graphitized carbon nanosheets has excellent rate performance and cycling stability.

8 Claims, No Drawings

TERNARY POSITIVE ELECTRODE MATERIAL COATED WITH NITRIDE/GRAPHITIZED CARBON NANOSHEETS AND PREPARATION METHOD THEREOF

FIELD OF THE DISCLOSURE

The disclosure relates to the technical field of lithium batteries, in particular to a ternary positive electrode material coated with nitride/graphitized carbon nanosheets and preparation method thereof.

BACKGROUND

As a new type of energy storage and conversion device, lithium-ion batteries are widely used in portable consumer electronics devices, new energy vehicles, energy storage grids and other fields. Lithium-ion batteries have many advantages, such as high working voltage, high energy density, high coulombic efficiency, no memory effect, long cycle life and environmental friendliness. The positive electrode materials for lithium-ion batteries determine the comprehensive performance of the batteries. Among the current mainstream positive electrode materials, the ternary positive electrode materials $LiNi_xCo_yM_{1-x-y}O_2$ (M=Mn or Al) have become a research focus, due to their high energy/power density and low-temperature performance.

With the increase of Ni content in the ternary positive electrode material, the capacity of the material increases, but its structural stability decreases. The reason is that the Ni—O bond energy is weak. In the charging and discharging process, oxidation-reduction reactions occur between the highly active interface and the electrolyte, and thus form an inactive rock-salt phase structure. In the process, the electrolyte is decomposed and a large amount of heat is released, resulting in a series of problems, such as cell inflation, safety performance degradation, discharge capacity decay, and cycle stability deterioration. At present, coating is one of the main ways to solve the problem. The coating agent can effectively avoid the direct contact between the highly active positive electrode interface and the electrolyte, and thus alleviate the occurrence of side reactions. The coating agent can also act as a fast ion conductor to provide a good channel for lithium ion diffusion and transmission. Therefore, the rate performance is improved. At present, the coating agent mainly includes oxides, such as $Al_2O_3$, $TiO_2$, $ZrO_2$, $B_2O_3$, $SiO_2$, etc. The oxides as coating agent can improve the above interface stability problems. However, most of the oxides belong to semiconductors, which have low electronic conductivity and cannot meet the requirements of high current charging and discharging. Compared with oxides, nitrides have better chemical corrosion resistance, more excellent electronic conductivity and thermal stability. With nitrides as coating agent, the electrical properties of ternary materials can be improved to a greater extent.

Currently, among the coating technologies of nitrides, the Chinese patent CN113097459A disclosed a gas phase deposition coating method. However, the gas phase reaction process is complex and not easy to produce on a large scale. The Chinese patent CN112174222A disclosed that the ternary positive electrode material coated with titanium nitride was prepared by mixing and sintering the ternary positive electrode material, titanium source and nitrogenous compounds in one step. The method is simple and convenient for industrial production. However, the reducing gas of the nitrogenous compounds may directly react with the ternary material in the preparation process, thereby destroying the lattice structure of the ternary positive electrode main material and affecting the electrical performance of the material.

SUMMARY

Technical problems to be solved by the disclosure are that the process of the gas phase deposition coating method is complex and the one-step mixed sintering method is easy to destroy the lattice structure of the ternary positive electrode main material, which will affect the performance of the material.

In the first aspect, the present invention provides a ternary positive electrode material coated with nitride/graphitized carbon nanosheets, which includes a ternary positive electrode material matrix and a coating layer; the coating layer is composed of nitride and graphitized carbon, and the graphitized carbon is formed in situ in the coating process of the nitride.

In the second aspect, the present invention provides a preparation method of the ternary positive electrode material coated with nitride/graphitized carbon nanosheets, including the following steps:
  providing ternary positive electrode material matrix;
  the coating element is coated on the surface of the ternary positive electrode material matrix by wet coating to obtain an intermediate product; wherein the coating element is one or more of Al, Si, Ti, Zr, Ta, Nb;
  the intermediate product is mixed with the carbonaceous and nitrogenous compound evenly, and the ternary positive electrode material coated with nitride/graphitized carbon nanosheets is obtained after sintering, pulverizing, sieving and iron removal.

The advantages of the technical scheme proposed in the disclosure are:
  in the present invention, the graphitized carbon layer structure is generated in situ in the coating process of the nitride on the surface of the ternary positive electrode material. Compared with a physical mixing method, the in-situ generated carbon layer is connected to the material matrix more tightly, and the formed conductive network is denser. So that the rate performance of the material is improved to the maximum extent. The preparation method of the ternary positive electrode material coated with nitride/graphitized carbon nanosheets is simple and easy to realize industrial production. And the obtained ternary positive electrode material coated with nitride/graphitized carbon nanosheets has excellent rate performance and cycle stability.

DETAILED DESCRIPTION OF PREFERRED EMBODIMENTS

In the first aspect, the present invention provides a ternary positive electrode material coated with nitride/graphitized carbon nanosheets, which includes a ternary positive electrode material matrix and a coating layer. The coating layer is composed of nitride and graphitized carbon, and the graphitized carbon is formed in situ in the coating process of the nitride. Compared with amorphous carbon, the graphitized carbon material has better conductivity and is more conducive to improving the rate performance.

In the present invention, the ternary positive electrode material matrix is one or more of nickel-cobalt-manganese ternary positive electrode materials or nickel-cobalt-aluminum ternary positive electrode materials, of which the structural formula is LiNi$_x$Co$_y$M$_{1-x-y}$O$_2$ (M=Mn or Al).

In an exemplary embodiment, x≥0.8.

In the present invention, the nitride is one or more of aluminum nitride, silicon nitride, titanium nitride, zirconium nitride, tantalum nitride, and niobium nitride.

In the present invention, the thickness of the coating layer is 1~100 nm.

In the second aspect, the present invention provides a preparation method of the ternary positive electrode material coated with nitride/graphitized carbon nanosheets, including the following steps:
S1. providing ternary positive electrode material matrix;
S2. the coating element is coated on the surface of the ternary positive electrode material matrix by wet coating to obtain an intermediate product; wherein the coating element is one or more of Al, Si, Ti, Zr, Ta, Nb;
S3. the intermediate product is mixed with the carbonaceous and nitrogenous compound evenly, and the ternary positive electrode material coated with nitride/graphitized carbon nanosheets is obtained after sintering, pulverizing, sieving and iron removal.

In the present invention, the transition metal nitride is produced by the reaction of the nitrogen element in the carbonaceous and nitrogenous compounds with the transition metal oxide coated on the surface of the intermediate product in a high-temperature environment. At the same time, carbon element forms graphitized carbon nanosheets in situ under the catalytic action of graphitization of transition metals. Thereby the ternary positive electrode material coated with nitride/graphitized carbon nanosheets was formed.

In the present invention, the specific steps of providing ternary positive electrode material matrix are as follows:
the precursor of ternary positive electrode material and the lithium source are mixed evenly, and then the ternary positive electrode material matrix is obtained after sintering, pulverizing, and sieving.

Further, the precursor of ternary positive electrode material is one or more of oxides, hydroxides, and oxyhydroxides of nickel-cobalt-manganese or nickel-cobalt-aluminum. The lithium source is one or more of lithium carbonate, lithium oxide, and lithium hydroxide. The molar ratio of the precursor of ternary positive electrode material to the lithium source is 1:(1~1.15). The precursor of ternary positive electrode material and the lithium source are mixed evenly by a high mixer, and the speed of the high mixer is 100~1500 rpm, further 1000 rpm, the mixing time is 0.5~5 h, further 1 h. The sintering is carried out under the oxygen atmosphere, and the volume concentration of the oxygen atmosphere is ≥99%; the sintering temperature is 500~1200° C., further 650~850° C., even further 750° C.; the sintering time is 5~24 h, further 10~14 h, even further 12 h.

Further, dopant is also added to improve the structural stability of the ternary positive electrode material in the preparation process of ternary positive electrode material matrix. For example, the dopant can be zirconium dioxide, aluminum trioxide, titanium dioxide, magnesium oxide, etc., which is not limited in the present invention. Furthermore, the molar ratio of the dopant to the precursor of ternary positive electrode material is (0.0001~0.1):1.

In the present invention, the mass ratio of the coating element to the ternary positive electrode material matrix is (0.0001~0.005):1, further (0.0004~0.003):1, even further (0.0008~0.001):1.

In the present invention, the specific steps of wet coating are as follows:
the ternary positive electrode material matrix is added to the first solvent to form solution I;
the compounds containing coating element is added to the second solvent to form solution II;
the solution II is added to the solution I slowly for heat preservation reaction, and the intermediate product is obtained after solid-liquid separation and drying.

Further, the compounds containing coating element are the alkoxides containing coating element. In an exemplary embodiment, the compounds containing coating element is one or more of aluminum triethoxide, tetratetraethyl orthosilicate, tetrabutyl titanate, titanium isopropoxide, zirconium isopropoxide, tantalum pentaethoxide, and niobium pentaethoxide; the first solvent and the second solvent are one or more of water, methanol, ethanol, isopropanol, and ethylene glycol, respectively.

Further, in solution I, the dosage ratio of the ternary positive electrode material matrix to the first solvent is (1~20) g:100 ml, further (10~20) g:100 ml; in solution II, the dosage ratio of the compounds containing coating element to the second solvent is (0.01~10) g:100 ml, further (0.04~1) g:100 ml, even further (0.1~0.6) g:100 ml, furthermore 0.2 g:100 ml.

Further, the heat preservation reaction temperature is 30~80° C., further 60° C., and the heat preservation reaction time is 0.5~5 h, further 1~2 h; the drying temperature is 80~120° C., and the drying time is 5~20 h.

In the present invention, the carbonaceous and nitrogenous compound is one or more of amino acids, melamine, and urea. Further, the mass ratio of the carbonaceous and nitrogenous compound to the intermediate product is (5~20):100. If the mass ratio is too high, it will lead to the surface coating (nitride and graphitized carbon) excessive. This will affect the capacity of the material. If the mass ratio is too low, it will lead to the surface coating less. This cannot reach the effect of the coating. The further ratio is (6~17):100, and even further 10:100. The carbonaceous and nitrogenous compound and the intermediate product are mixed evenly by a high mixer. The speed of the high mixer is 1000~4000 rpm, further 2000 rpm. The mixing time is 1~8 h, further 2 h. Sintering is carried out under the protection of inert gas, such as argon or nitrogen, etc. The sintering temperature is 500~1000° C., further 800° C. The sintering time is 3~12 h, further 6 h.

Example 1

(1) 500 g nickel cobalt manganese hydroxide ternary positive electrode material precursor Ni$_{0.83}$Co$_{0.12}$Mn$_{0.05}$(OH)$_2$, 240 g lithium hydroxide (LiOH·H$_2$O) and 1.5 g nano zirconium dioxide (ZrO$_2$) were transferred to a high mixer and mixed at a speed of 1000 rpm. After mixing for 1 h, the mixture was taken out and transferred to a muffle furnace for sintering. The sintering process was performed at 750° C. for 12 h under an oxygen atmosphere. After sintering, the sinter was taken out, then pulverized and sieved to obtain the ternary positive electrode material matrix.

(2) 400 g ternary positive electrode material matrix was transferred to 3000 ml ethanol to form solution I. 2 g titanium isopropoxide was transferred to 1000 ml ethanol to form solution II. After stirring for 10 min respectively, the solution II was added to the solution I slowly. Then, keeping stirring and heating a water bath to 60° C. for heat preservation reaction. After heat preservation reaction for 1 h, the mixed solution was converted to a filter cake by filter pressing. Subsequently, the filter cake was transferred to an oven at 100° C. for drying. And the intermediate product was obtained after drying for 10 h.

(3) 300 g the intermediate product and 30 g melamine were transferred to a high mixer and mixed at a speed of 2000 rpm. After mixing for 2 h, the mixture was transferred to a muffle furnace, and sintered at 800° C. for 6 h under an argon atmosphere. After sintering, the sinter was pulverized, sieved and iron-removed to obtain the ternary positive electrode material coated with nitride/graphitized carbon nanosheets.

Button battery test: The obtained ternary positive electrode material coated with nitride/graphitized carbon nanosheets ($LiNi_{0.83}Co_{0.12}Mn_{0.05}$) was mixed with acetylene black and PVDF in a ratio of 94:4:4. Then, NMP as a solvent was mixed with the mixture evenly and coated on aluminum foils to make 2032 button batteries for electrochemical performance test. The test voltage was 2.8~4.3 V, the charge-discharge current was 0.1 C/0.1 C in the first week and 1 C/1 C in the next 50-week for cycle test. Final test results: the 0.1 C discharge capacity was 210 mAh/g, the 1 C discharge capacity was 199 mAh/g, the 50-week cycle capacity retention rate was 98.6%.

Example 2

(1) 500 g nickel cobalt manganese hydroxide ternary positive electrode material precursor $Ni_{0.83}Co_{0.12}Mn_{0.05}(OH)_2$, 240 g lithium hydroxide ($LiOH \cdot H_2O$) and 1.5 g nano zirconium dioxide ($ZrO_2$) were transferred to a high mixer and mixed at a speed of 1000 rpm. After mixing for 1 h, the mixture was taken out and transferred to a muffle furnace for sintering. The sintering process was performed at 750° C. for 12 h under an oxygen atmosphere. After sintering, the sinter was taken out, then pulverized and sieved to obtain the ternary positive electrode material matrix.

(2) 400 g ternary positive electrode material matrix was transferred to 3000 ml ethanol to form solution I. 0.4 g titanium isopropoxide was transferred to 1000 ml ethanol to form solution II. After stirring for 10 min respectively, the solution II was added to the solution I slowly. Then, keeping stirring and heating a water bath to 60° C. for heat preservation reaction. After heat preservation reaction for 1 h, the mixed solution was converted to a filter cake by filter pressing. Subsequently, the filter cake was transferred to an oven at 100° C. for drying. And the intermediate product was obtained after drying for 10 h.

(3) 300 g the intermediate product and 15 g melamine were transferred to a high mixer and mixed at a speed of 2000 rpm. After mixing for 2 h, the mixture was transferred to a muffle furnace, and sintered at 800° C. for 6 h under an argon atmosphere. After sintering, the sinter was pulverized, sieved and iron-removed to obtain the ternary positive electrode material coated with nitride/graphitized carbon nanosheets.

Button battery test: The obtained ternary positive electrode material coated with nitride/graphitized carbon nanosheets ($LiNi_{0.83}Co_{0.12}Mn_{0.05}$) was mixed with acetylene black and PVDF in a ratio of 94:4:4. Then, NMP as a solvent was mixed with the mixture evenly and coated on aluminum foils to make 2032 button batteries for electrochemical performance test. The test voltage was 2.8~4.3 V, the charge-discharge current was 0.1 C/0.1 C in the first week and 1 C/1 C in the next 50-week for cycle test. Final test results: the 0.1 C discharge capacity was 208 mAh/g, the 1 C discharge capacity was 194 mAh/g, the 50-week cycle capacity retention rate was 93.7%.

Example 3

(1) 500 g nickel cobalt manganese hydroxide ternary positive electrode material precursor $Ni_{0.83}Co_{0.12}Mn_{0.05}(OH)_2$, 240 g lithium hydroxide ($LiOH \cdot H_2O$) and 1.5 g nano zirconium dioxide ($ZrO_2$) were transferred to a high mixer and mixed at a speed of 1000 rpm. After mixing for 1 h, the mixture was taken out and transferred to a muffle furnace for sintering. The sintering process was performed at 750° C. for 12 h under an oxygen atmosphere. After sintering, the sinter was taken out, then pulverized and sieved to obtain the ternary positive electrode material matrix.

(2) 400 g ternary positive electrode material matrix was transferred to 3000 ml ethanol to form solution I. 1 g titanium isopropoxide was transferred to 1000 ml ethanol to form solution II. After stirring for 10 min respectively, the solution II was added to the solution I slowly. Then, keeping stirring and heating a water bath to 60° C. for heat preservation reaction. After heat preservation reaction for 2 h, the mixed solution was converted to a filter cake by filter pressing. Subsequently, the filter cake was transferred to an oven at 100° C. for drying. And the intermediate product was obtained after drying for 10 h.

(3) 300 g the intermediate product and 20 g melamine were transferred to a high mixer and mixed at a speed of 2000 rpm. After mixing for 2 h, the mixture was transferred to a muffle furnace, and sintered at 800° C. for 6 h under an argon atmosphere. After sintering, the sinter was pulverized, sieved and iron-removed to obtain the ternary positive electrode material coated with nitride/graphitized carbon nanosheets.

Button battery test: The obtained ternary positive electrode material coated with nitride/graphitized carbon nanosheets ($LiNi_{0.83}Co_{0.12}Mn_{0.05}$) was mixed with acetylene black and PVDF in a ratio of 94:4:4. Then, NMP as a solvent was mixed with the mixture evenly and coated on aluminum foils to make 2032 button batteries for electrochemical performance test. The test voltage was 2.8~4.3 V, the charge-discharge current was 0.1 C/0.1 C in the first week and 1 C/1 C in the next 50-week for cycle test. Final test results: the 0.1 C discharge capacity was 209 mAh/g, the 1 C discharge capacity was 196 mAh/g, the 50-week cycle capacity retention rate was 97.9%.

Example 4

(1) 500 g nickel cobalt manganese hydroxide ternary positive electrode material precursor $Ni_{0.83}Co_{0.12}Mn_{0.05}(OH)_2$, 240 g lithium hydroxide ($LiOH \cdot H_2O$) and 1.5 g nano zirconium dioxide ($ZrO_2$) were transferred to a high mixer and mixed at a speed of 1000 rpm. After mixing for 1 h, the mixture was taken out and transferred to a muffle furnace for sintering. The sintering process was performed at 750° C. for 12 h under an oxygen atmosphere. After sintering, the sinter was taken out, then pulverized and sieved to obtain the ternary positive electrode material matrix.

(2) 400 g ternary positive electrode material matrix was transferred to 3000 ml ethanol to form solution I. 6 g titanium isopropoxide was transferred to 1000 ml ethanol to form solution II. After stirring for 10 min respectively, the solution II was added to the solution I slowly. Then, keeping stirring and heating a water bath to 60° C. for heat preservation reaction. After heat preservation reaction for 2 h, the mixed solution was converted to a filter cake by filter pressing. Subsequently, the filter cake was transferred to an oven at 100° C. for drying. And the intermediate product was obtained after drying for 10 h.

(3) 300 g the intermediate product and 50 g melamine were transferred to a high mixer and mixed at a speed of 2000 rpm. After mixing for 2 h, the mixture was transferred to a muffle furnace, and sintered at 800° C. for 6 h under an argon atmosphere. After sintering, the sinter was pulverized, sieved and iron-removed to obtain the ternary positive electrode material coated with nitride/graphitized carbon nanosheets.

Button battery test: The obtained ternary positive electrode material coated with nitride/graphitized carbon nanosheets ($LiNi_{0.83}Co_{0.12}Mn_{0.05}$) was mixed with acetylene black and PVDF in a ratio of 94:4:4. Then, NMP as a solvent was mixed with the mixture evenly and coated on aluminum foils to make 2032 button batteries for electrochemical performance test. The test voltage was 2.8~4.3 V, the charge-discharge current was 0.1 C/0.1 C in the first week and 1 C/1 C in the next 50-week for cycle test. Final test results: the 0.1 C discharge capacity was 207 mAh/g, the 1 C discharge capacity was 193 mAh/g, the 50-week cycle capacity retention rate was 97.4%.

Example 5

(1) 500 g nickel cobalt manganese hydroxide ternary positive electrode material precursor $Ni_{0.83}Co_{0.12}Mn_{0.05}$ $(OH)_2$, 240 g lithium hydroxide ($LiOH·H_2O$) and 1.5 g nano zirconium dioxide ($ZrO_2$) were transferred to a high mixer and mixed at a speed of 1000 rpm. After mixing for 1 h, the mixture was taken out and transferred to a muffle furnace for sintering. The sintering process was performed at 750° C. for 12 h under an oxygen atmosphere. After sintering, the sinter was taken out, then pulverized and sieved to obtain the ternary positive electrode material matrix.

(2) 400 g ternary positive electrode material matrix was transferred to 3000 ml ethanol to form solution I. 10 g titanium isopropoxide was transferred to 1000 ml ethanol to form solution II. After stirring for 10 min respectively, the solution II was added to the solution I slowly. Then, keeping stirring and heating a water bath to 60° C. for heat preservation reaction. After heat preservation reaction for 2 h, the mixed solution was converted to a filter cake by filter pressing. Subsequently, the filter cake was transferred to an oven at 100° C. for drying. And the intermediate product was obtained after drying for 10 h.

(3) 300 g the intermediate product and 60 g melamine were transferred to a high mixer and mixed at a speed of 2000 rpm. After mixing for 2 h, the mixture was transferred to a muffle furnace, and sintered at 800° C. for 6 h under an argon atmosphere. After sintering, the sinter was pulverized, sieved and iron-removed to obtain the ternary positive electrode material coated with nitride/graphitized carbon nanosheets.

Button battery test: The obtained ternary positive electrode material coated with nitride/graphitized carbon nanosheets ($LiNi_{0.83}Co_{0.12}Mn_{0.05}$) was mixed with acetylene black and PVDF in a ratio of 94:4:4. Then, NMP as a solvent was mixed with the mixture evenly and coated on aluminum foils to make 2032 button batteries for electrochemical performance test. The test voltage was 2.8~4.3 V, the charge-discharge current was 0.1 C/0.1 C in the first week and 1 C/1 C in the next 50-week for cycle test. Final test results: the 0.1 C discharge capacity was 198 mAh/g, the 1 C discharge capacity was 176 mAh/g, the 50-week cycle capacity retention rate was 97.5%.

Comparative Example 1

(1) 500 g nickel cobalt manganese hydroxide ternary positive electrode material precursor $Ni_{0.83}Co_{0.12}Mn_{0.05}$ $(OH)_2$, 240 g lithium hydroxide ($LiOH·H_2O$) and 1.5 g nano zirconium dioxide ($ZrO_2$) were transferred to a high mixer and mixed at a speed of 1000 rpm. After mixing for 1 h, the mixture was taken out and transferred to a muffle furnace for sintering. The sintering process was performed at 750° C. for 12 h under an oxygen atmosphere. After sintering, the sinter was taken out, then pulverized and sieved to obtain the ternary positive electrode material matrix.

(2) 400 g ternary positive electrode material matrix was transferred to 3000 ml ethanol to form solution I. 2 g titanium isopropoxide was transferred to 1000 ml ethanol to form solution II. After stirring for 10 min respectively, the solution II was added to the solution I slowly. Then, keeping stirring and heating a water bath to 60° C. for heat preservation reaction. After heat preservation reaction for 1 h, the mixed solution was converted to a filter cake by filter pressing. Subsequently, the filter cake was transferred to an oven at 100° C. for drying. And the intermediate product was obtained after drying for 10 h.

(3) 300 g the intermediate product and 30 g melamine were transferred to a high mixer and mixed at a speed of 2000 rpm. After mixing for 2 h, the mixture was transferred to a muffle furnace, and sintered at 800° C. for 6 h under an oxygen atmosphere. After sintering, the sinter was pulverized, sieved and iron-removed to obtain the ternary positive electrode material coated with nitride.

Button battery test: The obtained ternary positive electrode material coated with nitride ($LiNi_{0.83}Co_{0.12}Mn_{0.05}$) was mixed with acetylene black and PVDF in a ratio of 94:4:4. Then, NMP as a solvent was mixed with the mixture evenly and coated on aluminum foils to make 2032 button batteries for electrochemical performance test. The test voltage was 2.8~4.3 V, the charge-discharge current was 0.1 C/0.1 C in the first week and 1 C/1 C in the next 50-week for cycle test. Final test results: the 0.1 C discharge capacity was 206 mAh/g, the 1 C discharge capacity was 190 mAh/g, the 50-week cycle capacity retention rate was 97.0%.

Compared with prior art, the beneficial effects of the present invention are:

(1) The preparation method is pure solid phase reaction, and has the advantages of simple process, being easy to control the conditions and being easy to realize industrial production on a large scale.

(2) The whole coating process is divided into wet pre-coating step and subsequent high-temperature nitriding step. Compared with a one-step coating process, the wet pre-coating step not only provides a precursor for subsequent nitriding step, but also protects the ternary positive electrode material matrix from the damage of the subsequent carbon-nitrogen-containing reducing gases.

(3) Graphitized nanosheets are directly generated in situ under the catalysis of transition metals. Compared with a physical mixing method, the contact between the materials is closer, and the distribution of the conductive carbon layer network is more uniform, thereby greatly improving the conductivity of the composite material and enhancing the rate performance of ternary positive electrode material.

(4) The nitride generates accompanied by the formation of graphitized carbon coating, which enhances both the ionic conductivity and the electronic conductivity.

The above descriptions are only preferred embodiments of the present invention and are not intended to limit the present invention. Any modification, equivalent replacement, improvement, etc. made within the spirit and principle of the present invention shall be included in the protection of the present invention.

What is claimed is:

1. A preparation method of a ternary positive electrode material coated with nitride and graphitized carbon nanosheets, including the following steps:
    providing a ternary positive electrode material matrix;
    coating a coating element on a surface of the ternary positive electrode material matrix by wet coating to obtain an intermediate product; wherein the coating element is one or more of Al, Si, Ti, Zr, Ta, Nb; and
    mixing the intermediate product with a carbonaceous and nitrogenous compound evenly, and obtaining the ternary positive electrode material coated with nitride and graphitized carbon nanosheets after sintering, pulverizing, sieving and iron removal; wherein the sintering is carried out under the protection of inert gas.

2. The preparation method of the ternary positive electrode material coated with nitride and graphitized carbon nanosheets according to claim 1, wherein a mass ratio of the coating element to the ternary positive electrode material matrix is (0.0001-0.005):1.

3. The preparation method of the ternary positive electrode material coated with nitride and graphitized carbon nanosheets according to claim 1, wherein specific steps of the wet coating are as follows:
    adding the ternary positive electrode material matrix to a first solvent to form solution I;
    adding compounds containing the coating element to a second solvent to form solution II;
    adding the solution II to the solution I slowly for heat preservation reaction, and obtaining the intermediate product after solid-liquid separation and drying.

4. The preparation method of the ternary positive electrode material coated with nitride and graphitized carbon nanosheets according to claim 3, wherein the compounds containing the coating element are alkoxides containing the coating element; the first solvent and the second solvent are one or more of water, methanol, ethanol, isopropanol, and ethylene glycol, respectively.

5. The preparation method of the ternary positive electrode material coated with nitride and graphitized carbon nanosheets according to claim 3, wherein temperature of the heat preservation reaction is 30-80° C., and time of the heat preservation reaction is 0.5-5 h.

6. The preparation method of the ternary positive electrode material coated with nitride and graphitized carbon nanosheets according to claim 1, wherein the carbonaceous and nitrogenous compound is one or more of amino acids, melamine, and urea.

7. The preparation method of the ternary positive electrode material coated with nitride and graphitized carbon nanosheets according to claim 1, wherein a mass ratio of the carbonaceous and nitrogenous compound to the intermediate product is (5-20):100.

8. The preparation method of the ternary positive electrode material coated with nitride and graphitized carbon nanosheets according to claim 1, wherein sintering temperature is 500-1000° C., and sintering time is 3-12 h.

* * * * *